US010318966B2

(12) United States Patent
Ettl et al.

(10) Patent No.: US 10,318,966 B2
(45) Date of Patent: Jun. 11, 2019

(54) COMPUTER-IMPLEMENTED TECHNIQUES FOR DETERMINING AND PROVISIONING REAL-TIME INDIVIDUALIZED PRODUCT AND SERVICE OFFERING

(71) Applicant: International Business Machines Corporation, Armonk, NY (US)

(72) Inventors: Markus R. Ettl, Ossining, NY (US); Sechan Oh, Stanford, CA (US); Steven G. Pinchuk, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 14/843,590

(22) Filed: Sep. 2, 2015

(65) Prior Publication Data

US 2017/0061463 A1    Mar. 2, 2017

(51) Int. Cl.
*G06Q 10/00* (2012.01)
*G06Q 30/02* (2012.01)

(52) U.S. Cl.
CPC ......... *G06Q 30/02* (2013.01); *G06Q 30/0204* (2013.01); *G06Q 30/0224* (2013.01); *G06Q 30/0239* (2013.01); *G06Q 30/0226* (2013.01)

(58) Field of Classification Search
CPC ............... G06Q 30/02; G06Q 30/0207; G06Q 30/0239; G06Q 30/0241; G06Q 30/0251; G06Q 30/0254; G06Q 30/0255; G06Q 30/0261; G06Q 30/0269
See application file for complete search history.

(56) References Cited

U.S. PATENT DOCUMENTS

| 7,599,858 | B1 | 10/2009 | Grady et al. | |
|---|---|---|---|---|
| 7,636,677 | B1 | 12/2009 | McGonigal et al. | |
| 7,685,074 | B2 | 3/2010 | Linden et al. | |
| 7,970,664 | B2 | 6/2011 | Linden et al. | |
| 8,433,621 | B2 | 4/2013 | Linden et al. | |
| 8,671,018 | B2 | 3/2014 | Thomas et al. | |
| 2001/0014868 | A1* | 8/2001 | Herz ................... | G06Q 10/0637 705/14.38 |
| 2007/0174115 | A1* | 7/2007 | Chieu ................... | G06Q 30/02 705/14.25 |
| 2010/0106568 | A1* | 4/2010 | Grimes ................. | G06O 30/02 705/14.1 |
| 2011/0295722 | A1* | 12/2011 | Reisman ............ | G06Q 30/0201 705/27.1 |

(Continued)

OTHER PUBLICATIONS

Reutterer, T., Mild, A., Natter, M., & Taudes, A. (2006). A Dynamic Segmentation Approach for Targeting and Customizing Direct Marketing Campaigns. Journal of Interactive Marketing, 20(3-4), 43-57. (Year: 2006).*

*Primary Examiner* — William S Brockington, III
(74) *Attorney, Agent, or Firm* — Scully, Scott, Murphy & Presser, P.C.; Kurt P. Goudy, Esq.

(57) ABSTRACT

User information may be received and a market segment associated with the user may be received. A personalized or individualized offer may be determined based on the user information, the personalized offer determined based on a product offeror's goal with respect to the user at a given time. The market segment offer and the personalized offer may be blended to determine a recommended personalized offering for the user at the given time, e.g., given a company's tactical, strategic and lifetime goals and values for that user.

20 Claims, 4 Drawing Sheets

(56) References Cited

U.S. PATENT DOCUMENTS

| | | |
|---|---|---|
| 2012/0316986 A1 | 12/2012 | Levy et al. |
| 2012/0323663 A1 | 12/2012 | Leach |
| 2014/0172546 A1 | 6/2014 | Compain |
| 2014/0172627 A1 | 6/2014 | Levy et al. |
| 2014/0257920 A1 | 9/2014 | Gilman et al. |
| 2015/0220999 A1* | 8/2015 | Thornton ........... G06Q 30/0201 705/14.66 |

* cited by examiner

COMPUTER-IMPLEMENTED TECHNIQUES FOR DETERMINING AND PROVISIONING REAL-TIME INDIVIDUALIZED PRODUCT AND SERVICE OFFERING

FIELD

The present application relates generally to computers and computer applications, and more particularly to computer-implemented techniques that determine a real-time dynamic offering, e.g., blending market segment system based offering and an individualized offering.

BACKGROUND

New Distribution Capability (NDC) is a travel industry-supported program launched by International Air Transport Association (IATA) for the development and market adoption of a new, extensible markup language (XML)-based data transmission standard. NDC Shopping schemas enable airlines to distribute their full product offers and to merchandize their baggage, seat choices and ancillary services.

Enterprises, particularly those in the travel industry that use revenue management (RM) systems (RMS), use systems that create offers (a combination of price and/or product elements and/or services) to give to a customer, e.g., pricing and other product stipulations that combine to create an "offer" to that customer from that market segment based on what "market segment" the customer belongs to at the time of each purchase.

The classification of "market segment" can be something the customer knows they belong to (like a member of a group or demand from a certain sales channel or demand at a certain time), or the classification of a "market segment" and inclusion of customers in that defined "market segment" may be created by a forecasting model, where the segment and its members are created by the forecasting model and are not attributes the customer is aware of. When a customer buys an airline ticket the customer is usually not aware of what "market segment" the forecast model places the customer in because the placement into a particular "market segment" is based on both the customer's behavior at the time of purchasing that ticket and the airline's RMS which is creating continual forecasts and re-segmentations of demand. When the customer purchases another ticket the segment the customer belongs to is determined by the customer's behavior at that time and by the logic used by the forecasting system to define that market segment in its demand forecasting models. The "individual" is not a concept used by these systems other than the fact that customers belong to segments based on their behavior or attributes at the time each purchase is made.

Because these existing offer systems use "market segment" based attributes to group customers together and anonymously forecast demand and to determine the offer each member of the segment will receive, these systems are not able create individual offers.

BRIEF SUMMARY

A method and system of determining customized offering for an individual may be provided. In one aspect, the method may comprise receiving customer information. The method may also comprise determining by one or more processors, a market segment associated with the customer based on the customer information. The method may further comprise determining by one or more of the processors, a market segment offer associated with a product in the market segment. The method may also comprise determining by one or more of the processors, a personalized offer based on the individual customer's information, the personalized offer determined based on a product offeror's goal with respect to that individual customer at a given time. The method may also comprise blending by one or more of the processors, the market segment offer and the personalized offer to determine a recommended offering. The method may also comprise providing the recommended offering.

A system of determining a customized offering, in one aspect, may comprise a processor operable to receive customer information. A storage device may be operable to store a data warehouse comprising, for example, all available individual customer information, including but not limited to loyalty program data, sales transaction data, click-stream data, and social media activity data. The processor may be further operable to determine a market segment associated with the customer based on the customer information. The processor may be further operable to determine a market segment offer associated with a product in the market segment. The processor may be further operable to determine a personalized offer based on the customer information, the personalized offer determined based on a product offeror's goal with respect to the customer at a given time, and one or more of the available data sources including but not limited to loyalty program data, the sales transaction data, the click-stream data, and the social media activity data. The processor may be further operable to blend the market segment offer and the personalized offer to determine a recommended offering and provide the recommended offering. The offering may create both the personalized and the blended offering.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
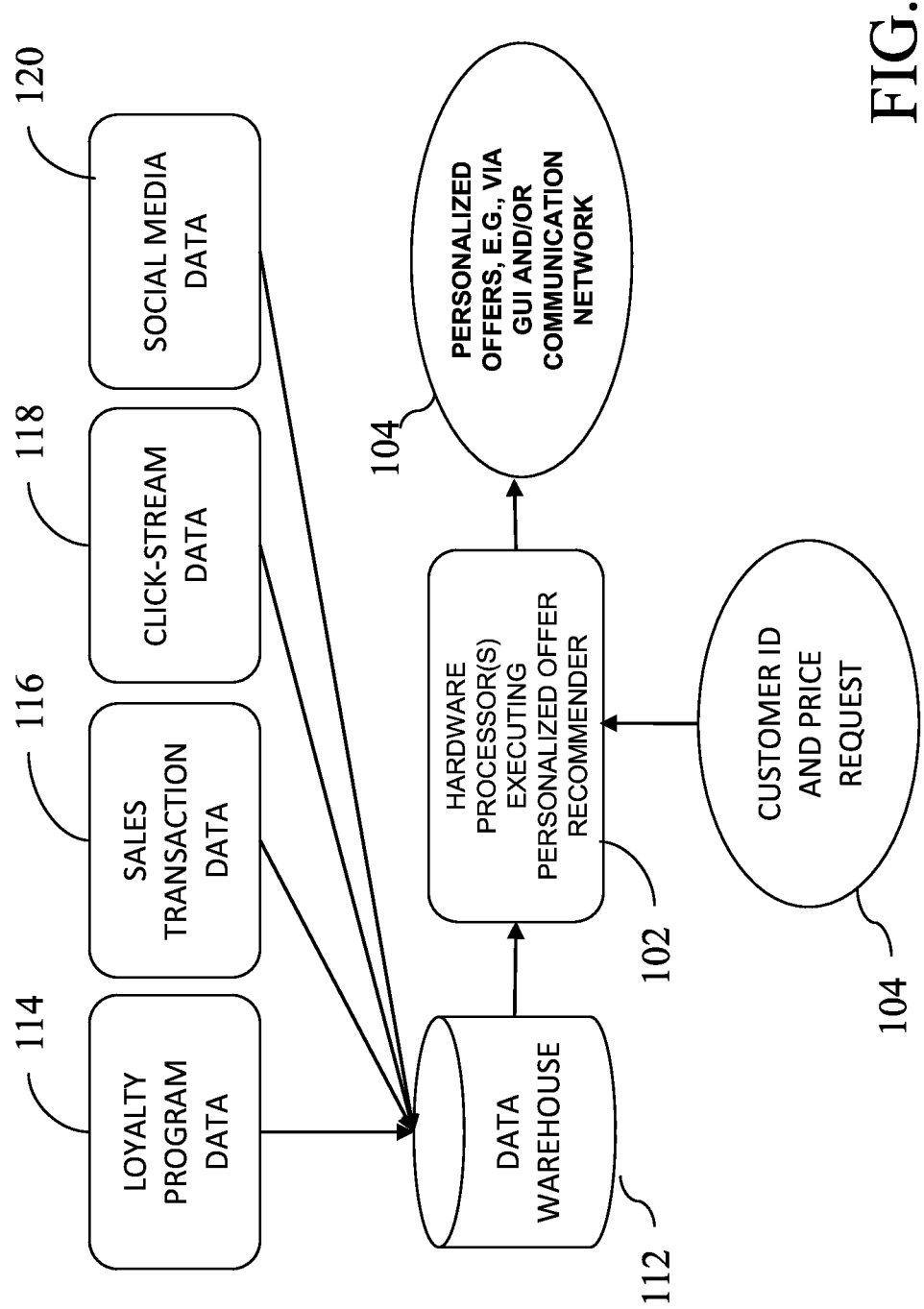
FIG. 1 is a diagram illustrating a method of recommending customized offers with personalized elements and/or price based on stored and/or live customer profiles in one embodiment of the present disclosure.

System, method and techniques may be provided that monitor, e.g., all customer and market data including but not limited to a user's click-stream and social media activities, for example, on an online social network, and analyze the data associated with the user's click-stream and social media activities, analyze other data such as historical sales data and loyalty membership program data. Such analysis, in one aspect, may determine the best personalized offerings, e.g., using real-time data about customers.

A method in one embodiment may generate customized offers that may include products and/or services, by adding auxiliary products and/or services to the core products and/or services of interest. Examples of auxiliary products and/or service may include, e.g., products and/or services that can add value in the perception of the customer, e.g., shuttle service, free baggage, and bonus miles. An example of core product and/or service of interest may include, but is not limited to, a flight ticket.

In one aspect, a method in one embodiment uses the monitored social media activity data to segment customers and to estimate their propensity-to-pay. The method in one embodiment constructs live profiles of customers by analyzing their click-streams.

A click-stream refers to a recording of user clicks or activities on a computer, for example, while browsing or navigating on a user interface page of an application (e.g., a web browser or another software application user interface). A click-stream may include a sequence of page requests (e.g., web pages or another user interface pages), which a user issues while browsing or running an application. A click-stream may be recorded, for example, with a permission of a user.

Social media data refers to information or data created by individual users, for example, on computer sites such as computer-implemented social network sites or platforms that allow users to post and share information. Examples of social network sites or platforms may include, but are not limited to, microblogging sites, wikis, opinion sites, and others. Social network sites or platforms generally allow users to share content, e.g., text, pictures, media or multimedia content.

A system and method may be also provided that allow individual customers who are given offers as part of a market segment, to be given individualized offers while letting the existing offer system to simultaneously process the same customer. Existing "market segment" offer based systems do not know or care about the following individual customer attributes, because they cannot process offers based on these attributes: e.g., who the individual customer is. They process the same offers to be given to segments of anonymous customers who all share certain attributes (when they will buy, what they want to buy, the market channel their demand came from, etc.), all parameters that are "market segment" based and not based on that person as an individual and their individual history with the company. These current "market segment" based offer systems are not concerned with many individual customer attributes that a company would like to use to customize the offer to that individual.

On the other hand, an organization may want to customize an individual offer based on a customer's individual history with the company, their potential future value or other customer specific behaviors found in that customer's individual history (data): the lifetime value of the customer; frequency or how often that customer has purchased; sensitivity; and others. Traditional segment based offers are not personalized and do not take into account the long time or lifetime value of the customer. In one embodiment, the blended offer can take into account any customer information, e.g., including their lifetime value. Then an offer can be created that is strategic in nature and targets the retention and lifetime value of that customer unlike tactical offers that only try to optimize the revenues or profits of that one tactical transaction in time.

A system and/or method of the present disclosure in one embodiment may address with "segment based" offers, individual customer profile data or projections, the position that the individual customer is in regarding their relationship growth with a company, what the company would like to do with a customer's individual offer to address different customer objectives for each specific offer given to them. These objectives can be different by customer, or be different within the lifecycle of that same customer, and the objectives may be defined by each customer's unique data and the results of analysis of this data.

The system and/or method of the present disclosure in one embodiment may create individual customer offers that can handle all dynamic individual customer profiles, all potential actions an organization may want to take with each customer, and run in parallel with an existing market segment based offer system to provide a blended offer.

The system and/or method of the present disclosure in one embodiment may customize an offer to an individual to target and improve frequency, loyalty, upsell or cross sell opportunities, lifetime value potential and retention or churn.

The system and/or method of the present disclosure in one embodiment may allow a customer to request an offer from a market segment based system using a customer or loyalty number or other data to identify the customer. The customer is also allowed to request an offer that is individualized. For example, a customer may request an airline ticket using an individual identification such as a frequent flyer customer number. This allows the market segment based system to determine the market segment that the customer belongs to and also allows to, e.g., simultaneously, identify that customer as a unique individual.

In one embodiment, an individual offer may be created in parallel with the market segment offer base system. The individual offer may be compared with the market segment based offer. Given the two inputs (individual offer and market segment based offer), the system and/or method of the present disclosure in one embodiment determine a blended offer to give to an individual customer. In this way, a market segment based offer system is augmented to also create more individual blended offers for individual customers while not disrupting the market based offer system. The existing market based offer system may still be used, for example, for customers who the organization may have no individual information and therefore could not create an individual offer.

FIG. 1 is a diagram illustrating a method and components for a personalized offer system in one embodiment of the present disclosure. Information may be obtained on a core product that a given customer is interested. A 102, a customer profiling modeler or a personalized offer recommender receives customer identification 104 and generates a personalized offer 104 based on data such as name, loyalty program data 114, historical sales data 116, click-stream data 118 and social media data 120, for example, stored in a data warehouse 112. The personalized offer recommender 102, for example, may include a statistical model that may estimate or predict a customer's willingness to pay for a product or service based on historical data, and other data, e.g., stored in the data warehouse 112. The personalized offer recommender 102 in one embodiment is a computer-implemented module that executes on one or more hardware processors that are operatively coupled to one or more storage devices 112 and communicate with data warehouse functionality.

A customer segmentation model may be constructed using data mining techniques such as K-means clustering based on loyalty program activities (e.g., 114), historical purchases (e.g., 116), click-stream data (e.g., 118) and public profile information elicited from social media data (e.g., 120). In one aspect, the customer segmentation model may be pre-constructed or pre-built.

In one embodiment, the system and method of the present disclosure may provide for creating personalized offers by blending the outputs of a personalization engine with the outcome of market segment-based pricing or offer system (which may be anonymous), for example, after a customer submits an offer quote for the product the customer is interested in. The system and method of the present disclosure, for example, addresses how to use in parallel personalization and anonymous (market segment based) offer engines to generate personalized offers. In one aspect, the personalized offers are generated in real time dynamically.

Figure 2:
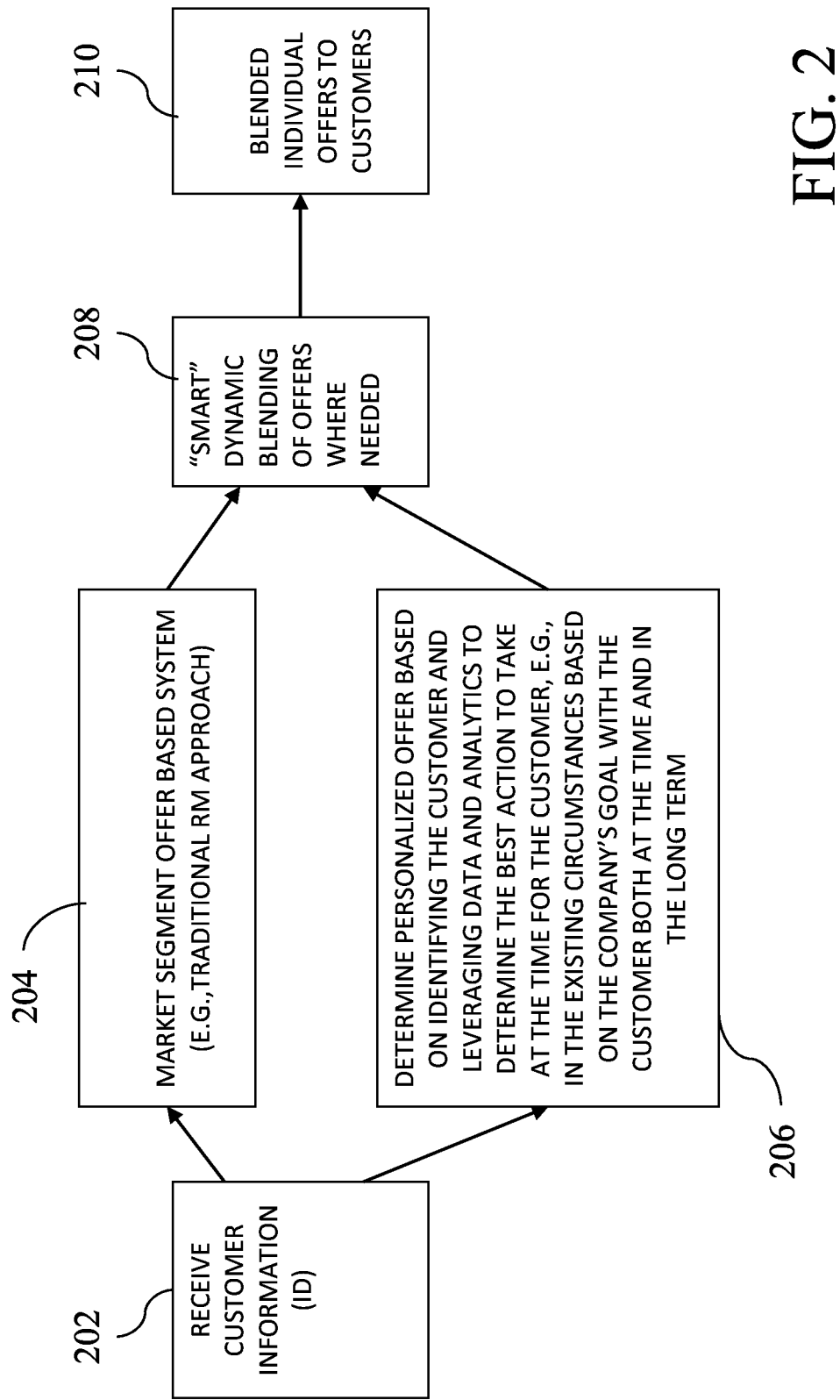
FIG. 2 is a diagram that illustrates a method in another aspect that provides a customized offering in one embodiment of the present disclosure.

FIG. 2 is a diagram that illustrates a method that provides customized offering by blending a segment based offer with an individualized offer to a user or customer in one embodiment of the present disclosure. One or more hardware processors, micro-processors, or computer processors execute the method shown in FIG. 2. In the present disclosure, the terms customer and user are used interchangeably, and refer to an individual for whom an offer is being determined. At 202, customer or user information may be received. For instance, a customer enters the customer's identification information. In one aspect, a customer may enter the information via a graphical user interface displayed on a display device. For example, a processor receives, e.g., via a graphical user interface such as a browser or the like receives user input on a computer or mobile device or the like.

At 204, a market segment offer based system may be run or executed (e.g., in a computer system) to determine an offer for a determined market segment that is associated with the customer. In one aspect, this market segment based offer is dynamic in that the offer determined by the market segment offer based system changes depending on (or based on) the market demand, market availability and other changing factors in the market. The market segment offer systems may be provided, for example, in markets such as travel industry or market, where offers and pricing may change frequently and different customers using the same product may pay different prices based on different criteria or factors. The market segment offer tells about the market. In one embodiment, the market segment offer based system includes computer-implemented modules that execute on one or more hardware processors and perform various analytics in determining the offer for the determined market segment that is associated with the user.

At 206, a personalized offer may be determined based on identifying the customer and leveraging all data and analytics to determine the best action to take at a given time, for the customer (given customer). The method described with reference to FIG. 1 may be used to determine the personalized offer in one embodiment. In one aspect, determining the personalized offer may take into account the existing or current circumstances; determining the personalized offer may also take into account the predicted lifetime value of the customer and their recent activities. For example, the existing or current circumstances may include a product offeror's or company's goal with respect to the given customer, for example, at the given time and/or in the long term. Examples of the company's goal with respect to the given customer may include, but are not limited to, retention, loyalty, up sell, cross sell, relationship repair, price sensitivity testing, and others. In one aspect, there can be many goals a company has for an individual customer at a given time. The goals can change over time or circumstances for the same customer. In one aspect, the goals may not be related to the current offer. The goals may be strategic or tactical and may have existed before or were triggered by the offer.

At 208, blending of offers is performed. For example, the personalized offer determined at 206 and the offer given from the market segment based system may be blended or combined. In addition, factors such as the amount of lost (displaced) revenue or investment the company is willing to take in the short term (a sale) in order to invest in the given customer, for one or more reasons whether in the short term and/or also in the long term, may be taken into account in the blending. The blending of offers can also include in its decision(s) inputs from the company's non-personalized segment based offer system. Such additional information can include, but are not limited to, demand and supply forecasts for market segments and products as well as the outputs of the non-personalized segment based offer system's optimization results. These optimization results may include, but are not limited to, Revenue Management System calculations of probabilities and "displacement values" which tell the company what the value of other demand will be that would be displaced if a proposed individual offer or blended offer was used. For example, if the company would not have to deny any other demand to offer its personalized or blended offer then there is no displacement to take into consideration when determining the investment being made in the individual customer by making the personalized or blended offer. If, however, other demand would be displaced by the personalized or blended offer, then by getting the value of the predicted displaced demand allows for the ability to know what the total investment is in offering certain personalized or blended results. Such data and analytics that may be performed when the results of the non-personalized segment based offer system's forecasting, optimization and other results are used as inputs to the individual offering system of the present disclosure.

In one aspect, the determining of a personalized offer at 206 runs in parallel with a market segment based offer environment or market. For example, one or more hardware processors execute the determining of market segment based offer and the determining of a personalized offer in parallel. In another aspect, the determining of a personalized offer at 206 runs sequentially to the market segment based offer environment or market 204 that determines the market segment based offer. In one aspect, the market segment based offer environment or market does not create personalized offers. Rather, the pricing determined at the market segment based offer environment at 204 may be based on the market segment in general, for example, anonymous of any one particular individual.

At 208, the two offers (e.g., pricing offers determined at 204 and 206) are blended. The goals of the blending may change based on the customer, the products and the market at the given time.

At 210, blended individual offers are transmitted to one or more customers, for example, a customer who requested the offer. The blended individual offers may be transmitted over computer communication network, e.g., to a user's device such as user's mobile device. In one aspect, the determination of the blended individual offer may automatically trigger a presentation of a user interface display or panel on a user's device, for example, a mobile device such as a smartphone. For example, the blended individual offer may be communicated via a wireless channel as an alert to a user's device, and activate an application or the like on the user's device to automatically display the alert and connect to, e.g., the offeror's website using a uniform resource locator (URL) that may be included in the alert, when the user's device comes online, to allow the user to view or access the offer. In another aspect, the personalized offer can be communicated in a medium that is determined to be optimal for that customer at that time.

By running the personalized offering determination in parallel with the market segment based offer system, a new capability may be provided for the product offeror or the company to personalize offers in a traditionally non-personalized market and process. For instance, rather than providing the same offer in the market segment, personalized offer may be provided for an individual in the same market segment, for example, based on the product offeror's goal with respect to a particular customer. The system and method of the present disclosure in one embodiment combines the market segment offer knowledge with individualized customization for different customers, for example, at different times. In one aspect, the offers are personalized in near real time, dynamically, and the offer can vary between customers as well as for the same customer at different times.

In one aspect, the individualized market segment offers may be determined based on a live dynamic individual updated customer profile, for example, available at all times. This can also be accomplished using an individual profile that is updated on a schedule or on demand in a non-real time mode.

In one aspect, the blending at 208 may be performed by a blending engine (e.g., a computer executable module) running on a processor and, for example, operatively connected to or coupled to a web server site that provides product offers with pricing. An example of such web server site may include, but is not limited to, an airline ticketing site. The engine behind that airline ticketing site, as one example, can also be powering multiple other sales interfaces for other companies, websites or networks such as the Global Distribution Systems (GDS), online travel agencies (OTA's) and other means of distributing and pricing inventory throughout the global markets in real time or in batch mode. For instance, responsive to a customer or a user navigating to the web site and entering information to purchase an airline ticket, the blending engine may perform the methodologies of the present disclosure in one embodiment to provide an optimal offering, for example, for the benefit of both the customer and the product offeror.

An offer refers to a combination of one or more products, services, and points, and their quantities, and the price of the offer. Product examples may include a hotel room with room type, a flight ticket with cabin class. Service examples may include a guided tour at destination, shuttle services, a check-in baggage service, a lounge access service. Point examples may include a hotel reward point, a hotel tier qualifying stay number, airline award mileage, airline tier point. The offer can add new products and services to what the non-personalized segment based offer system's optimization results were without changing the price. An offer can add new products and services to what the non-personalized segment based offer system's optimization results were with changing the price. An offer can add no new products and services to what the non-personalized segment based offer system's optimization results were with a change in the price.

As an example, a product or service may have a hierarchy. For instance, a product/service type can take one or more values, and there may a transitive order between different values of the same product/service type. For example, Executive suite room>(greater than) Junior suite room> (greater than) Standard king room=(equal to) Standard double room. As another example, First class seat>(greater than) business class seat>(greater than) premium economy seat>(greater than) economy seat. If there is no universal transitive order between different values of a single product or service type, the single type may be divided into multiple product or service types that meet this requirement. An example offer may include 1 Standard King Room, 1 bonus tier qualifying Stays, and 5000 bonus reward points at $400. Another example of an offer may include 1 Economy premium ticket, 1 bonus free check-in bag, 1 free lounge access, and 8000 bonus award mileages at $790.

An offer A is dominated by offer B if offer B includes the same or higher quantities of the same or better products, services, points included in offer A and the price of offer B is the same, more or less than offer A.

In the following example, offer A is dominated by offer B (same prices with better product/service/points). Offer A: 1 Standard King Room, 1 bonus Tier Qualifying Stays, and 5000 bonus Reward points at $400. Offer B: 1 Junior Suite Room, 1 bonus Tier Qualifying Stays, and 5000 bonus Reward points at $400.

In the following example, offer A is dominated by offer B (same product/service/points with different prices). Offer A: 1 Standard King Room, 1 bonus Tier Qualifying Stays, and 5000 bonus Reward points at $400. Offer B: 1 Standard King Room, 1 bonus Tier Qualifying Stays, and 5000 bonus Reward points at $350.

In the following example, there is no order between offer A and offer B (different orders for different service/product/ point types). Offer A: 1 Standard King Room, and 1 bonus Tier Qualifying Stays at $400. Offer B: 1 Standard King Room, and bonus 5000 Reward points at $400.

In the following example, there is no order between offer A and offer B (better service/product/point types at higher price). Offer A: 1 Standard King Room, 1 bonus Tier Qualifying Stays, and 5000 bonus Reward points at $400. Offer B: 1 Junior Suite Room, 1 bonus Tier Qualifying Stays, and 5000 bonus Reward points at $450.

Other products or services may not have a hierarchy or dominance. The methodology of the present disclosure may apply to product and/or services regardless of whether there is a hierarchy or dominance associated with the product and/or service.

Figure 3:
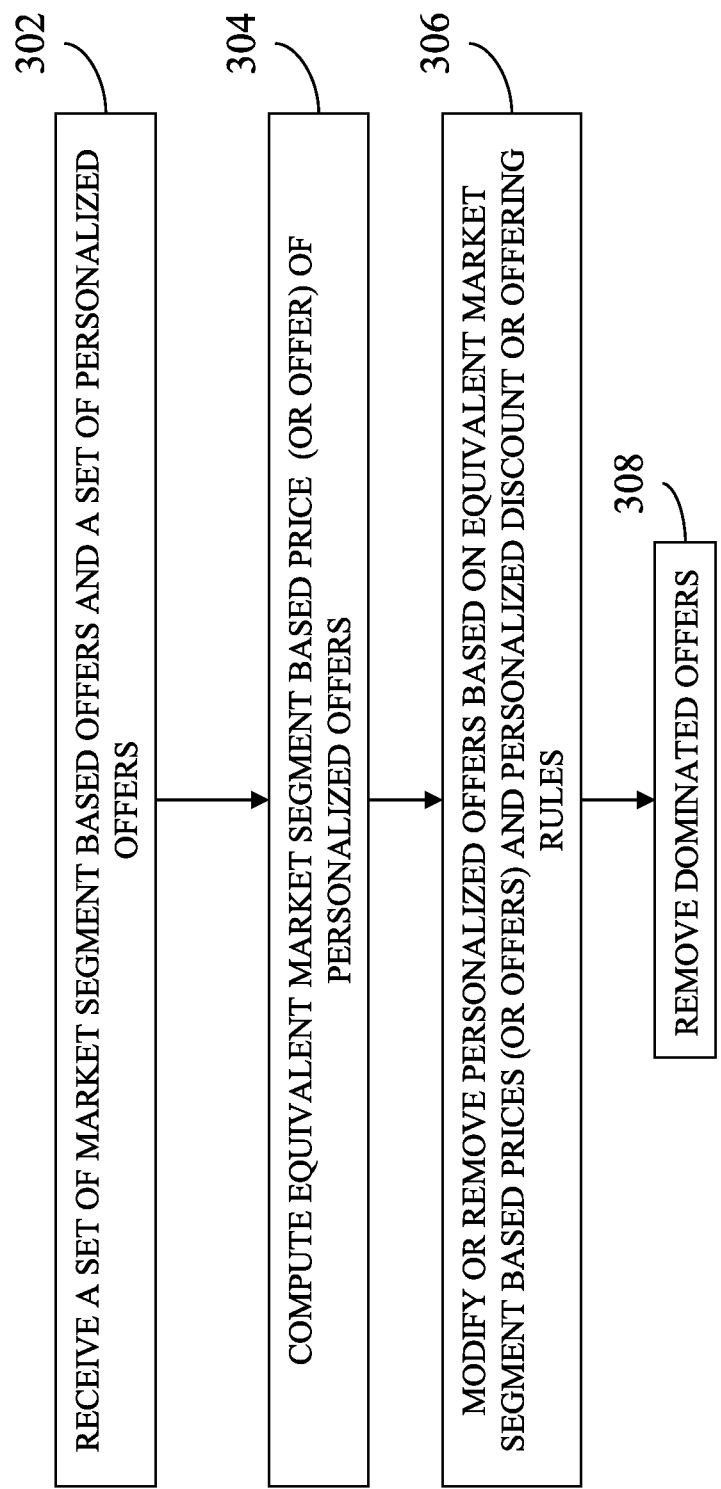
FIG. 3 is a flow diagram illustrating offer blending in one embodiment of the present disclosure.

FIG. 3 is a flow diagram illustrating offer blending (e.g., FIG. 2 at 208) in one embodiment of the present disclosure. At 302, a single or a set of market segment based offers and a set of personalized offers are received.

At 304, equivalent market segment based price (or offer) of personalized offers is computed. In one embodiment, the equivalent market segment based price of a personalized offer A is the summation of the multiplication of the quantity and the unit market segment based price of all products, services, and points included in the personalized offer A. The unit market segment price of a product/service/price is the price at which customers can purchase the item without customer information, based on the market segment of the customers at a given time in the non-personalized segment based offer system. When a product/service/price such as bonus tier qualifying stay is not available to purchase, an assessed unit cost of the item may be used.

At 306, the method may include modifying or removing personalized offers based on equivalent market segment based prices and personalized discount rules. The price of a personalized offer may be purely determined by a customer's willingness-to-pay, and do not take into account the opportunity cost of the sales, or market demand, which are key inputs to market segment based offer system. The processing at 306 ensures that the effective discount applied to personalized offers does not exceed a limit or threshold set by a user (e.g., marketing manager). The limit can be set differently for each individual or for each customer segment based on the offeror's goal with respect to the individual or customer market segment.

If the absolute difference or percentage difference between the personalized price and the equivalent market segment based price of a personalized offer exceeds the limit (threshold), offer blender may remove the personalized offer, or increase the personalized price so that the difference falls within the limit or threshold, or remove and/or add one or more of the component elements of the personalized offer. The "investment" in the individual offer, calculated as the cost of making the personalized offer versus allowing the offer elements to be sold to other predicted demand at non personalized offers, can be stored to calculate the investment made in that one customer. This can be used for calculating the return of investment (ROI) of individual or groupings of personalized or blended offers.

At 308, dominated offers are removed. For the given set of market segment based offers and the set of modified personalized offers, offer blender first removes all offers that are dominated by other offers. The processing at 308 in one aspect ensures that customers do not receive personalized offers that are worse than market segment based offers, and also reduces the number of offers that the customer sees. In one aspect, all customers may not see all offers at once. For example, distribution channels may not show multiple offers. One offer to show may be determined, e.g., while storing other offers in a memory queue. For instance, when the offer shown is not accepted, or if the customer desires to scroll through multiple offers, the offers stored in the memory queue may be displayed or presented.

The system and/or method of the present disclosure in one embodiment may provide the following benefits. For instance, market segment based offer (revenue management) systems used by airline and hotel companies, and other travel and non-travel based market segment based offer systems rely on various sources of aggregate level of data such as unconstrained supply and demand forecasts, optimization, and competitor prices. Personalized pricing solutions leverage individual customer level data, which enables the company to estimate individual customer's valuations on products, services, and reward points. The existing personalized pricing solutions often do not take into account aggregate level demand and capacity (supply) information, and competitive price information. Incorporating individual level data into existing revenue management systems will drastically complicate computational requirements, and may critically reduce the robustness and the responsiveness of the system. In the present disclosure in one embodiment, a system and method may use an existing market segment based offer system and an additional personalized pricing solution to generate personalized offers in an efficient and robust way.

Figure 4:
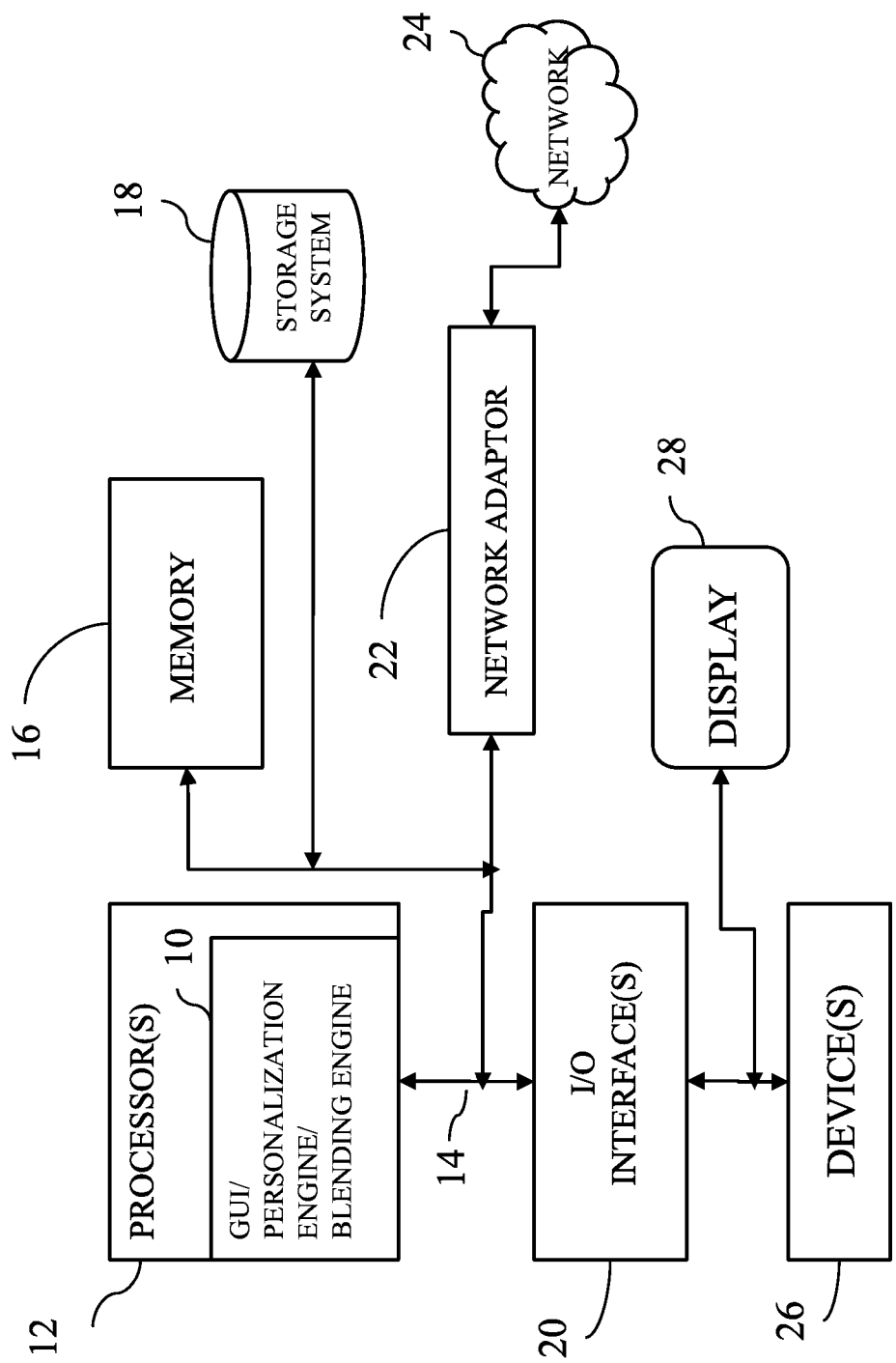
FIG. 4 illustrates a schematic of an example computer or processing system that may implement a system that determines a customized offering in one embodiment of the present disclosure.

FIG. 4 illustrates a schematic of an example computer or processing system that may implement a system that provides customized offers in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10, for example, a graphical user interface, a personalization engine and blending engine that perform the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of determining real-time individualized offering, comprising:
receiving, by one or more processors, user information associated with a user;
receiving, by one or more of the processors, a market segment offer associated with a product;
determining, by one or more of the processors, a personalized offer based on the user information, the personalized offer determined based on a product offeror's goal with respect to the user at a given time;
blending, by one or more of the processors, the market segment offer and the personalized offer to determine a recommended offering that is consistent with a user's goal at the given time of the offering, the blending comprising:
determining an equivalent market segment based offer of the personalized offer, the equivalent market segment based offer determined as a summation of a multiplication of a quantity and a unit market segment price of all items included in the personalized offer, the unit market segment price of an item being a price at which customers can purchase the item without customer information, based on a market segment of the customers at the given time in a non-personalized segment based offer system; and
modifying the personalized offer based on the equivalent market segment based offer and one or more personalized offering rules, the modifying comprising: responsive to determining that a difference between the personalized offer and the equivalent market segment based offer exceeds a threshold, performing at least one of removing the personalized offer, increasing a price of the personalized offer, removing a component element of the personalized offer, and adding a component element of the personalized offer, so that the difference is within the threshold; and
providing, by one or more of the processors, the recommended offering to the user via a user's device, the providing comprising:
activating the user's device to automatically connect to a product offeror's web site.

2. The method of claim 1, wherein the market segment offer changes based on changing factors.

3. The method of claim 1, wherein the providing comprises sending an alert to the user's device over a wireless channel to activate the user's device to automatically connect to the product offeror's web site.

4. The method of claim 1, wherein the product offeror's goal comprises one or more of retention, loyalty, up sell, cross sell, relationship repair, or price sensitivity testing, or combinations thereof, and wherein the product offeror's goal with respect to the user changes over time.

5. The method of claim 1, wherein receiving the market segment offer and determining the personalized offer are executed in parallel.

6. The method of claim 1, wherein the personalized offer is determined based on one or more of a live dynamic user profile and a stored dynamic user profile, the personalized offer updated in one or more of batch and real time based on information available at the given time that adds value to the recommended offering, the information comprising at least one or more of loyalty program data, sales transaction data, click-stream data, social media activity data.

7. The method of claim 1, wherein the providing, by one or more of the processors, the recommended offering to the user via the user's device further comprises: responsive to determining the recommended offering comprises multiple offerings, causing presenting of one offering while other offerings are stored in a memory queue, and responsive to receiving an indication to scroll through the multiple offerings, causing presenting of the other offerings stored in the memory queue.

8. A computer readable storage medium storing a program of instructions executable by a machine to perform a method of determining real-time individualized offering, comprising:
receiving, by one or more processors, user information associated with a user;
receiving, by one or more of the processors, a market segment offer associated with a product;
determining, by one or more of the processors, a personalized offer based on the user information, the personalized offer determined based on a product offeror's goal with respect to the user at a given time;
blending, by one or more of the processors, the market segment offer and the personalized offer to determine a recommended offering that is consistent with a user's goal at the given time of the offering, the blending comprising:

determining an equivalent market segment based offer of the personalized offer, the equivalent market segment based offer determined as a summation of a multiplication of a quantity and a unit market segment price of all items included in the personalized offer, the unit market segment price of an item being a price at which customers can purchase the item without customer information, based on a market segment of the customers at the given time in a non-personalized segment based offer system; and modifying the personalized offer based on the equivalent market segment based offer and one or more personalized offering rules, the modifying comprising: responsive to determining that a difference between the personalized offer and the equivalent market segment based offer exceeds a threshold, performing at least one: of removing the personalized offer, increasing a price of the personalized offer, removing a component element of the personalized offer, and adding a component element of the personalized offer, so that the difference is within the threshold; and providing, by one or more of the processors, the recommended offering to the user via a user's device, the providing comprising:

activating the user's device to automatically connect to a product offeror's web site.

9. The computer readable storage medium of claim 8, wherein the market segment offer changes based on changing factors.

10. The computer readable storage medium of claim 8, wherein the providing comprises sending an alert to the user's device over a wireless channel to activate the user's device to automatically connect to the product offeror's web site.

11. The computer readable storage medium of claim 10, wherein the product offeror's goal comprises one or more of retention, loyalty, up sell, cross sell, relationship repair, or price sensitivity testing, or combinations thereof, wherein the product offeror's goal with respect to the user can change over time and with each offering.

12. The computer readable storage medium of claim 8, wherein receiving the market segment offer and determining the personalized offer are executed in parallel.

13. The computer readable storage medium of claim 8, wherein the personalized offer is determined based on a dynamic customer profile, the personalized offer updated in one or more of real time and in batch mode, based on information available at the given time that adds value to the recommended offering, the information comprising at least one or more of loyalty program data, sales transaction data, click-stream data, social media activity data.

14. The computer readable storage medium of claim 8, wherein the providing, by one or more of the processors, the recommended offering to the user via the user's device further comprises: responsive to determining the recommended offering comprises multiple offerings, causing presenting of one offering while other offerings are stored in a memory queue, and responsive to receiving an indication to scroll through the multiple offerings, causing presenting of the other offerings stored in the memory queue.

15. A system of determining real-time individualized offering, comprising:

a storage device operable to store data associated with a user and market segments, the data comprising at least loyalty program data, sales transaction data, click-stream data, social media activity data;

a processor coupled to the storage device and further operable to receive user information associated with the user, the processor further operable to receive a market segment offer associated with a product;

the processor further operable to determine a personalized offer based on the user information, the personalized offer determined based on a product offeror's goal with respect to the user at a given time;

the processor further operable to blend the market segment offer and the personalized offer to determine a recommended offering that is consistent with a user's goal at the given time of the offering, the processor blending the market segment offer and the personalized offer comprising:

determining an equivalent market segment based offer of the personalized offer, the equivalent market segment based offer determined as a summation of a multiplication of a quantity and a unit market segment price of all items included in the personalized offer, the unit market segment price of an item being a price at which customers can purchase the item without customer information, based on a market segment of the customers at the given time in a non-personalized segment based offer system; and modifying the personalized offer based on the equivalent market segment based offer and one or more personalized offering rules, the modifying comprising: responsive to determining that a difference between the personalized offer and the equivalent market segment based offer exceeds a threshold, performing at least one: of removing the personalized offer, increasing a price of the personalized offer, removing a component element of the personalized offer, and adding a component element of the personalized offer, so that the difference is within the threshold; and the processor further operable to provide the recommended offering to the user via a user's device, the processor providing recommended offering comprising:

activating the user's device to automatically connect to a product offeror's web site.

16. The system of claim 15, wherein the market segment offer changes based on changing factors.

17. The system of claim 15, wherein the personalized offer is determined based on the product offeror's goal with respect to the user at the given time and in a long term.

18. The system of claim 17, wherein the product offeror's goal comprises one or more of retention, loyalty, up sell, cross sell, relationship repair, price sensitivity testing, or combinations thereof, wherein the product offeror's goal with respect to the user changes over time.

19. The system of claim 15, wherein the processor receives the market segment offer and determines the personalized offer in parallel.

20. The system of claim 15, wherein the processor providing the recommended offering further comprises: responsive to determining the recommended offering comprises multiple offerings, causing presenting of one offering while other offerings are stored in a memory queue, and responsive to receiving an indication to scroll through the multiple offerings, causing presenting of the other offerings stored in the memory queue.

* * * * *